United States Patent
Kuo et al.

(10) Patent No.: US 11,068,239 B2
(45) Date of Patent: Jul. 20, 2021

(54) CURVE FUNCTION DEVICE AND OPERATION METHOD THEREOF

(71) Applicant: NEUCHIPS CORPORATION, Hsinchu (TW)

(72) Inventors: Huang-Chih Kuo, Hsinchu (TW); Youn-Long Lin, Hsinchu (TW)

(73) Assignee: NEUCHIPS CORPORATION, Hsinchu (TW)

( * ) Notice: Subject to any disclaimer, the term of this patent is extended or adjusted under 35 U.S.C. 154(b) by 78 days.

(21) Appl. No.: 16/675,181

(22) Filed: Nov. 5, 2019

(65) Prior Publication Data

US 2021/0064341 A1    Mar. 4, 2021

(30) Foreign Application Priority Data

Aug. 30, 2019    (TW) ................................ 108131435

(51) Int. Cl.
*G06F 7/556* (2006.01)
*G06F 17/17* (2006.01)
*G06F 1/03* (2006.01)

(52) U.S. Cl.
CPC ............ *G06F 7/556* (2013.01); *G06F 1/0307* (2013.01); *G06F 17/17* (2013.01)

(58) Field of Classification Search
CPC ......... G06F 7/556; G06F 17/17; G06F 1/0307
USPC ......................................... 708/200, 270–277
See application file for complete search history.

(56) References Cited

U.S. PATENT DOCUMENTS

| | | | |
|---|---|---|---|
| 5,179,528 A | 1/1993 | Robertson et al. | |
| 10,860,050 B2 * | 12/2020 | Lan | ........................... G06F 1/03 |
| 2003/0236675 A1 | 12/2003 | Duan | |
| 2017/0364329 A1 | 12/2017 | Lee | |
| 2018/0060278 A1 * | 3/2018 | Lin | ........................ G06F 7/544 |
| 2020/0401873 A1 * | 12/2020 | Lin | ...................... G06N 3/0481 |

FOREIGN PATENT DOCUMENTS

| | | |
|---|---|---|
| EP | 2677660 | 3/2016 |
| WO | 2018044505 | 3/2018 |

* cited by examiner

*Primary Examiner* — Tan V Mai
(74) *Attorney, Agent, or Firm* — JCIPRNET (57) ABSTRACT

A curve function device and an operation method thereof are provided. The curve function device includes a lookup table, a weight calculation circuit, and a linear function circuit. According to first partial bits of an input value, a bias value of a current segment and a bias value of a next segment can be extracted from the lookup table. The weight calculation circuit can calculate a weight value of the current segment according to the bias value of the current segment and the bias value of the next segment. The linear function circuit can calculate a linear function value by using the bias value of the current segment, the weight value of the current segment, and second partial bits of the input value. This linear function value can be used as an approximate value of the curve function.

19 Claims, 5 Drawing Sheets

CURVE FUNCTION DEVICE AND OPERATION METHOD THEREOF

CROSS-REFERENCE TO RELATED APPLICATION

This application claims the priority benefit of Taiwan application serial no. 108131435, filed on Aug. 30, 2019. The entirety of the above-mentioned patent application is hereby incorporated by reference herein and made a part of this specification.

BACKGROUND OF THE DISCLOSURE

Field of the Disclosure

The present disclosure relates to a calculating circuit, and in particular, to a curve function device and an operation method thereof.

Description of Related Art

During operation of some electronic circuits, a curve function is required to be calculated. For example, in the electronic circuit, a Sigmoid function and/or a Tan h function may need to be calculated to facilitate application tasks in fields such as image processing, logic regression, and artificial intelligence, etc. For example, in a neural network model, the Sigmoid function and/or the Tan h function may be used as an activation function to improve efficacy of the neural network model. Both the Sigmoid function and the Tan h function include an exponential operation and a division operation. Therefore, a large number of logic gates and complex calculation circuits are required in implementing the circuit, resulting in an increase in hardware costs.

Therefore, various approximation algorithms are proposed to be implemented in the curve function device, to simplify an operation of the curve function. The approximation algorithm can be used to calculate an approximate value of the curve function, but it also leads to a calculation error. If the error is excessively large, efficacy of a system is affected. For example, accuracy of the neural network model decreases. How to reduce a calculation amount while reducing the error of the curve function device is a technical subject in the field to which the present disclosure pertains.

It should be noted that content in the paragraphs under the "Related Art" is intended to assist in understanding the present disclosure. Some content (or all content) disclosed in the paragraphs under the "Related Art" may not be conventional technologies known to those of ordinary skill in the art. The content disclosed in the paragraphs under the "Related Art" does not mean that the content is known to those of ordinary skill in the art prior to application of the present disclosure.

SUMMARY OF THE DISCLOSURE

The present disclosure provides a curve function device and an operation method thereof, to calculate an approximate value of a curve function.

An embodiment of the disclosure provides a curve function device. The curve function device is configured to calculate an approximate value of a curve function by using an input value. The curve function device includes a lookup table, a weight calculation circuit, and a linear function circuit. The lookup table includes at least a bias value field. The weight calculation circuit may extract a bias value of a current segment and a bias value of a next segment from a bias value field of the lookup table according to first partial bits of the input value. The weight calculation circuit may calculate a weight value of the current segment according to the bias value of the current segment and the bias value of the next segment. The linear function circuit is coupled to the weight calculation circuit to receive the weight value of the current segment. The linear function circuit may extract the bias value of the current segment from the bias value field of the lookup table according to the first partial bits of the input value. The linear function circuit may calculate a linear function value by using the bias value of the current segment, the weight value of the current segment, and second partial bits of the input value. The linear function value may be used as the approximate value of the curve function.

An embodiment of the disclosure provides an operation method of a curve function device. The curve function device is configured to calculate an approximate value of a curve function by using an input value. The operation method includes: providing a lookup table; extracting a bias value of a current segment and a bias value of a next segment from a bias value field of the lookup table according to first partial bits of the input value; calculating, by a weight calculation circuit, a weight value of the current segment according to the bias value of the current segment and the bias value of the next segment; and calculating, by a linear function circuit, a linear function value (used as the approximate value of the curve function) by using the bias value of the current segment, the weight value of the current segment, and the second partial bits of the input value.

Based on the above, according to the curve function device and the operation method thereof in the embodiments of the present disclosure, a range of the input value is partitioned into a plurality of segments, where the bias values corresponding to these segments are pre-stored in the bias value field of the lookup table. When the input value is input to the curve function device, the curve function device may learn, according to the first partial bits of the input value, that the input value is a corresponding segment (which is referred to as a current segment below) of these segments. Therefore, the curve function device may extract the bias value of the current segment and the bias value of the next segment (an adjacent segment of the current segment) from the bias value field of the lookup table according to the first partial bits of the input value. The bias value of the current segment and the bias value of the next segment may be used to calculate the weight value of the current segment. The bias value of the current segment and the weight value of the current segment may be used as a coefficient of the linear function corresponding to the current segment. Therefore, the linear function circuit may calculate the linear function value by using the bias value of the current segment, the weight value of the current segment, and the second partial bits of the input value, and then the linear function value is used as the approximate value of the curve function.

In order to make the aforementioned and other objectives and advantages of the present disclosure comprehensible, embodiments accompanied with figures are described in detail below.

DESCRIPTION OF THE EMBODIMENTS

The term "coupled (or connected)" used in the entire specification (including the claims) may mean any direct or indirect connection means. For example, a first device coupled (connected) to a second device described herein should be interpreted as that the first device may be directly connected to the second device, or that the first device may be indirectly connected to the second device by other devices or by some means of connection. Terms such as "first" and "second" used in the entire specification (including the claims) are used to name components (elements) or to distinguish between different embodiments or ranges, and are not intended to define the upper or lower limit of the number of components or the order of components. Wherever possible, the same reference numbers are used in the drawings and the description to refer to the same or like parts, components or steps. For parts, components or steps denoted by same reference numbers or names, reference can be made to the related descriptions.

A Sigmoid function and/or a Tan h function are used as an example of a "curve function". Both the Sigmoid function and the Tan h function have a symmetric property that an input value is zero. In other words, |Tan h(X)|=|Tan h(-X)|, and |Sigmoid(X)|=|Sigmoid(-X)|. Therefore, when Tan h(X) is calculated, Tan h(-X) can be derived. Similarly, when Sigmoid(X) is calculated, Sigmoid(-X) can be derived. In addition, both the Sigmoid function and the Tan h function can be converted from one to the other, which is shown in Equation 1. Therefore, during implementation of a hardware circuit, calculation of the Sigmoid function and the Tan h function can be implemented by using the same set of circuits.

$$\text{Sigmoid}(X) = \frac{\text{Tanh}(X/2)}{2} + 0.5 \quad \text{(Equation 1)}$$

In the following plurality of embodiments, the Tan h function is used as an example for describing the "curve function". Related descriptions of the Tan h function may be applied to the Sigmoid function through analogy. Alternatively, an approximate value of the Tan h function may be first calculated, and an approximate value of the Sigmoid function is then obtained by using Equation 1 through conversion.

Figure 1:
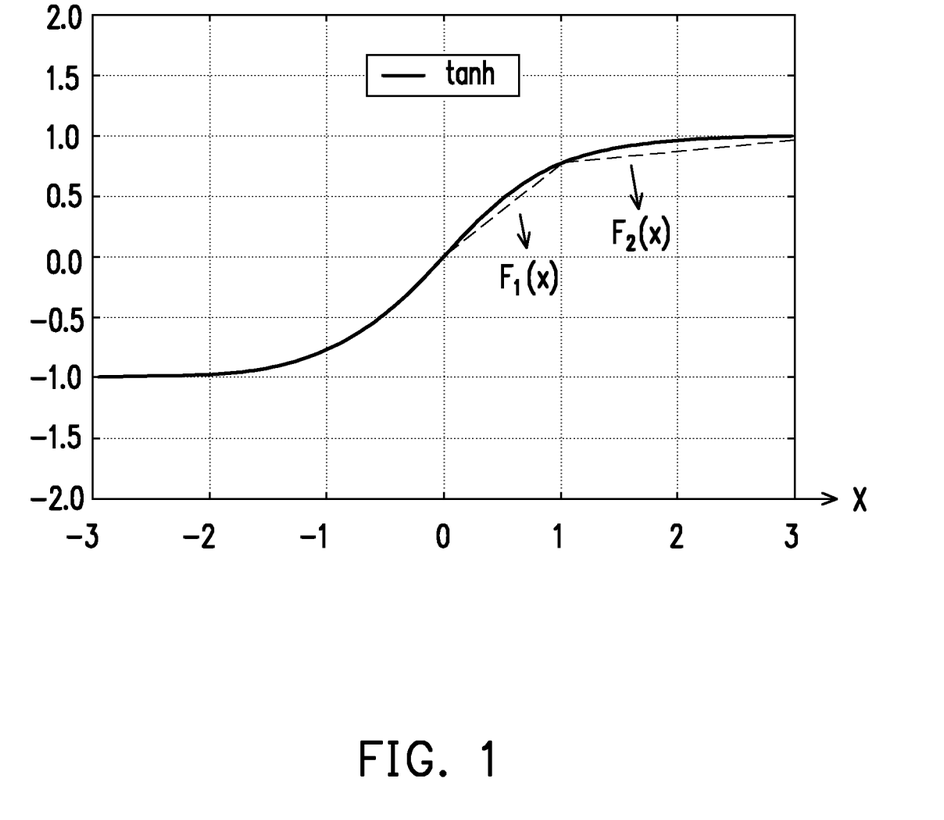
FIG. 1 is a schematic diagram illustrating piecewise approximation of a Tan h function.

A common approximation algorithm is piecewise linear approximation. In this algorithm, the curve function (the Sigmoid function or the Tan h function) is partitioned into a plurality of segments, and then approximation is performed on different segments of the curve function by using different linear functions. FIG. 1 is a schematic diagram illustrating piecewise approximation of a Tan h function. A horizontal axis shown in FIG. 1 represents an input value X, and a vertical axis represents a function value. In the example shown in FIG. 1, a value of the Tan h function for which the input value X is between 0 and 3 is partitioned into two segments. A first segment (an interval with an input value X of 0 to 1) approximates the Tan h function by using a linear function $F_1(X)$, and a second segment (an interval with an input value X of 1 to 3) approximates the Tan h function by using a linear function $F_2(X)$. A comparator needs to be configured for a curve function device, to determine a segment (which is referred to as a current segment below) of the Tan h function to which a current input value X belongs. After the current segment is determined, the curve function device may calculate a linear function corresponding to the current segment to obtain an approximate value of the Tan h function. When it is found that an error value between the approximate value of the Tan h function (that is, a value of the linear function $F_1(X)$) in the first segment (the interval with the input value X of 0 to 1) and the value of the Tan h function is excessively large, the first segment may be further partitioned to achieve more accurate approximation (a reduced error value).

The forgoing linear function may be a linear function $F_n(X)=W_n*X+B_n$ for approximating a value of the Tan h function. For example, the linear function $F_1(X)=W_1*X+B_1=0.761594156*X+0$, and the linear function $F_2(X)=W_2*X+B_2=0.116693287*X+0.644974893$. Appropriate storage space needs to be configured for the curve function device, to record a weight value $W_1$ and a bias value $B_1$ of the linear function $F_1(X)$ and a weight value $W_2$ and a bias value $B_2$ of the linear function $F_2(X)$. When it is found that the error of the approximate value is excessively large (not meeting a design requirement), the Tan h function may be partitioned into more segments to reduce the error. However, increasing a quantity of segments means that more comparators are required to determine a segment to which the current input value X belongs, and more storage space is required to record weight values $W_n$ and bias values $B_n$ of different linear functions.

Different from the foregoing embodiment in which the Tan h function (or the Sigmoid function) is used as a target for approximation, in the following embodiments, a value obtained by multiplying the Tan h function (or the Sigmoid function) by a power of 2 (that is, $2^N$, and N is an integer) is used as a target for approximation. Herein, "multiplying the Tan h function (or the Sigmoid function) by a power of 2" may be referred to as an error estimation mechanism. Through the error estimation mechanism, the error value between the approximate value (that is, the value of the linear function) and the value of the Tan h function (or the Sigmoid function) can meet the design requirement.

The Tan h function is used as an example. Tan h(X) is multiplied by $2^N$ to obtain a function R(X), and then the function R(X) is used as the target for approximation. Assuming that an approximate value of the approximation function R(X) is R'(X), an error value between the Tan h function and an approximate value approximating the Tan h function is shown in Equation 2.

$$\frac{R'(X) - R(X)}{2^N} \quad \text{(Equation 2)}$$

Equation 2 may be referred to as an error estimation equation, where $2^N$ may be referred to as an error factor. A value of the error depends on a difference between R'(X) and R(X). Let the difference a=|R'(X)−R(X)|, then the error value between the Tan h function and the approximate value approximating the Tan h function is $a/2^N$. If there is a higher requirement for approximation accuracy, a first method is multiplying a value of Tan h(X) by a larger value. For example, the Tan h(X) is multiplied by $2^N+1$ to obtain a function S(X)=Tan h(X)*$2^{N+1}$ and then the function S(X) is used as the target for approximation. It is assumed that an approximate value of the approximation function S(X) is S'(X)|. Let a difference b=|S'(X)−S(X)|, then an error value between the Tan h function and an approximate value approximating the Tan h function is $b/2^{N+1}$. As long as b<a, $b/2^{N+1}<a2^N$.

If there is a higher requirement for approximation accuracy, a second method is reducing the difference, that is, to enable R'(X) to be more approximate to R(X). Piecewise linear approximation is used as an example. A size of each segment obtained after partitioning affects the error value and an amount of to-be-stored data. In the most extreme case, when there is only one value for each segment, the error value between the Tan h function and the approximate value approximating the Tan h function is zero. Therefore, in the foregoing example, if R'(X) is a function obtained through piecewise linearization, a number of segments is increased to reduce the value of a.

In any case, a weight value $W_n$ and a bias value $B_n$ of each segment need to be stored for piecewise linear approximation. In order to achieve a relatively good balance between an error value and storage space, the Tan h function may be partitioned into unequal segments, that is, sizes of the segments are different from each other. There are fewer segments in an interval in which the Tan h function is relatively linear (a small change in a slope), and there are more segments where transition of the Tan h function is sharper (a great change in the slope). Because of unequal segments, additional comparators are required to find out a segment within which each input value X falls. More segments require more comparators.

In order to omit the comparator, a fixed segment size is used in the following embodiments. For example, partitioning starts from an input value X of 0, and each segment includes a power of 2 (for example, $2^S$) input values. A value of the integer S depends on a requirement on the error value. In a hardware circuit, if the input value X is denoted by using Q bits, the curve function device may extract low-order M+S bits of the Q bits to perform an operation. Relatively high-order M bits may be used as an index value of an interval (a current segment) in which the input value X is located, and low-order S bits may be used as an input value in the current segment. Because the index value of the current segment can be directly obtained by using the input value X, the comparator may be omitted.

How to save a storage capacity is described below. For all input values X, a to-be-approximated target in the following embodiments is Tan h(X)*$2^N$=R(X). Herein, the input value X is partitioned into a plurality of equal segments, and each segment includes $2^S$ input values X. Then, a minimum value $Y_0$ of the input value X in each segment is used, a value of $R(Y_0)$ is set as a bias value $B_n$ of a segment to which the input value X belongs, and an initial weight of the segment to which the input value X belongs is calculated by using Equation 3. $Y2^S-1$ in Equation 3 is a maximum value of the input value X in the segment to which the input value X belongs. In later description, a last weight value $W_n$ is calculated according to the initial weight in Equation 3.

$$\text{Initial Weight} = \frac{R(Y2^S - 1) - R(Y0)}{2^S - 1} * 2^S \quad \text{(Equation 3)}$$

In consideration of hardware costs, in order to reduce a usage amount of the storage space, calculation may be performed by using Equation 4 to obtain a low-cost (LC) weight $W_{LC}$. A mode of using the low-cost weight $W_{LC}$ as the weight value $W_n$ is a low-cost mode.

$$W_{LC}=R(Y_2s)-R(Y_0) \quad \text{(Equation 4)}$$

$R(Y_0)$ in Equation 4 is the bias value $B_n$ of the segment (the current segment) to which the input value X belongs, and $R(Y_2s)$ is a bias value $B_n$ of a next segment. Therefore, during implementation of a low-cost hardware circuit, the curve function device needs to store only a bias value $B_n$ of each segment and a weight value $W_n$ of a last segment. The curve function device can calculate the weight value $W_n$ by using bias values $B_n$ of adjacent two segments, and therefore the curve function device does not need to store the weight value $W_n$.

Actually, according to characteristics of the Tan h function, as the input value X becomes positively infinite (or negatively infinite), the value of the Tan h function approaches 1 (or −1), that is, the slope (or the weight value $W_n$) of the Tan h function approaches 0. According to characteristics of the Sigmoid function, as the input value X becomes positively infinite (or negatively infinite), a value of the Sigmoid function approaches 1 (or 0), that is, a slope (or a weight value $W_n$) of the Sigmoid function approaches 0. In other words, the weight value $W_n$ of the last segment of the Tan h function (or the Sigmoid function) is very close to 0. When the weight value $W_n$ of the last segment is very close to 0, the curve function device can store the bias value Bn of each segment instead of storing the weight value Wn of the last segment.

When a higher accuracy is required for approximation calculation may be performed by using the following Equation 5 to obtain a high-accuracy (HA) weight Wu. A mode of using the high-accuracy weight WA as the weight value $W_n$ is a high-accuracy mode.

$$W_{HA}=R(Y_2s)-R(Y_0)+K=W_{LC}+K \quad \text{(Equation 5)}$$

A value of K (a correction factor) in Equation 5 is obtained by adding two values. A first value is a difference of the initial weight and the low-cost weight $W_L$ in Equation 3, and a second value is used to tune a variable for approximating a slope of R(X). The value of K in Equation 5 is determined according to the design requirement and a curve of the Tan h function (or the Sigmoid function) to tune the high-accuracy weight $W_{HA}$, thereby achieving better approximation accuracy. During implementation of the hardware circuit, the curve function device may store bias values of different segments and the value of K (the correction factor). As described above, the value of K is a sum of the difference and a tuning value. A number of bits required by the value of K is less than that required by the weight value. For example, the number of bits of the value of K may be 1-3.

Figure 2A:
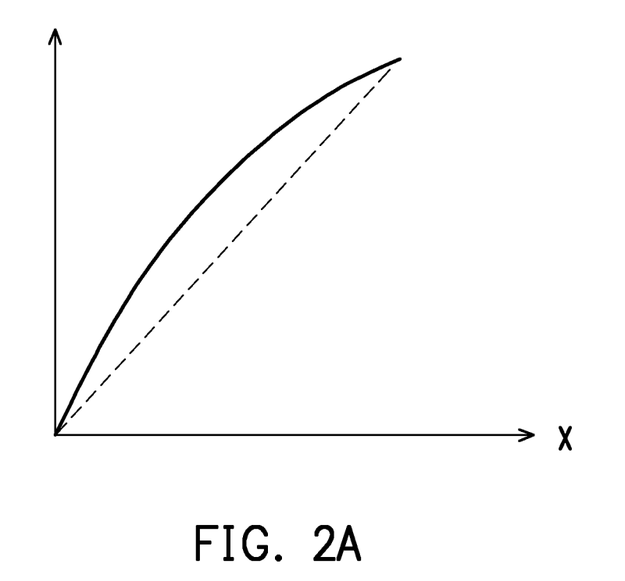
FIG. 2A and FIG. 2B are schematic diagrams of a curve function and a linear function.
Figure 2B:
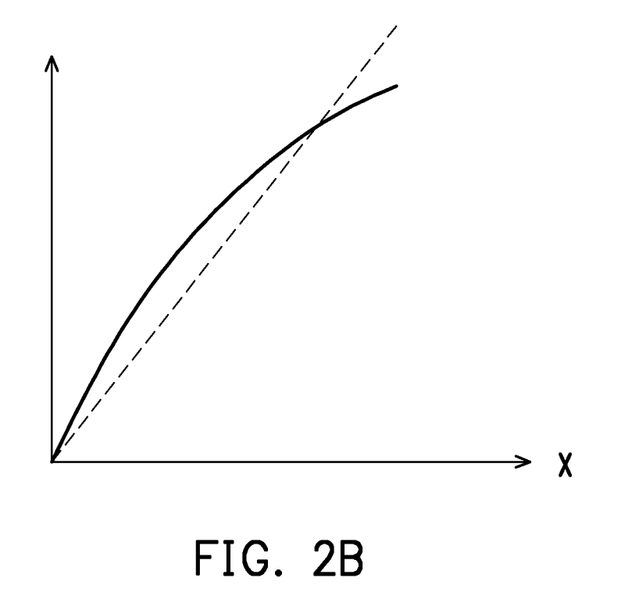

FIG. 2A and FIG. 2B are schematic diagrams of a curve function and a linear function. In FIG. 2A and FIG. 2B, a horizontal axis represents an input value X, and a vertical axis represents a function value. Solid curves shown in FIG. 2A and FIG. 2B represent a specific segment of the Tan h function (or the Sigmoid function). A dashed line shown in FIG. 2A indicates an approximation function (a linear function) obtained according to the initial weight calculated in Equation 3. A dashed line shown in FIG. 2B indicates an approximation function (a linear function) obtained according to a tuned weight value (for example, the high-accuracy weight $W_{HA}$ in Equation 5). It can be learned from comparison of FIG. 2A to FIG. 2B that a smaller error can be obtained by using the approximation function (the linear function) shown in FIG. 2B.

After the bias value and the weight value are calculated, for any input value X, a linear T'(X) for approximating the approximate value of the Tan h function (X) is obtained by using Equation (6) after a minimum value X0 of an interval (a current segment) in which the input value X is located is found.

$$T'(X) = \left[\frac{(X - X0) * W_n}{2^S} + B_n\right] / 2^N \qquad \text{(Equation 6)}$$

In Equation 6, $2^S$ is a size of each segment, $2^N$ is an error factor, and $W_n$ may be a low-cost weight $W_{LC}$ or a high-accuracy weight $W_{HA}$ depending on an application requirement. Because the size of each segment is a power of 2, the expression (X-X0) in Equation 6 does not need to be implemented by using a subtractor, but using only S low-order bits of the input value X.

Figure 3:
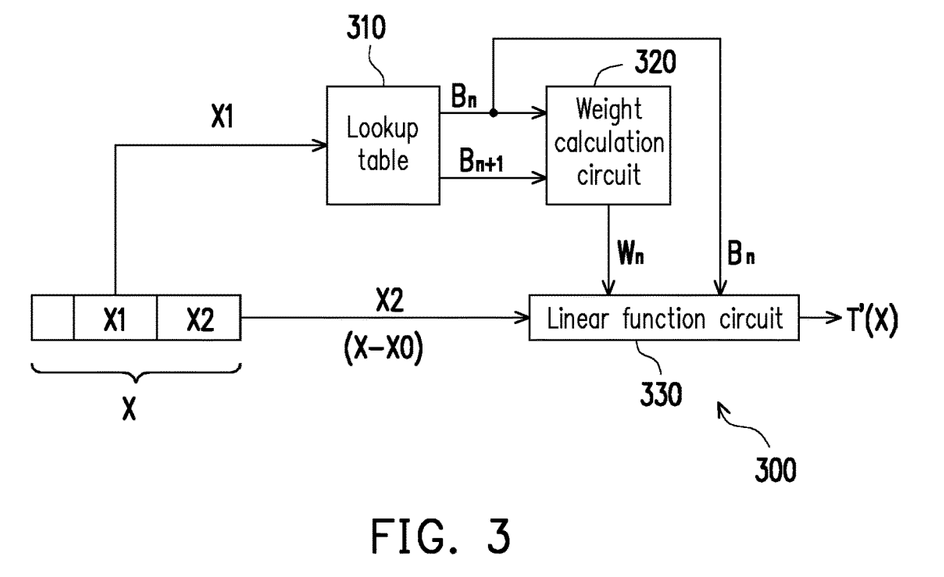
FIG. 3 is a schematic circuit block diagram of a curve function device according to an embodiment of the disclosure.

FIG. 3 is a schematic circuit block diagram of a curve function device according to an embodiment of the disclosure. A curve function device 300 shown in FIG. 3 is configured to calculate an approximate value of a curve function (for example, a Tan h function or a Sigmoid function) by using an input value X. The function device 300 includes a lookup table (LUT) 310, a weight calculation circuit 320, and a linear function circuit 330. The lookup table 310 has at least a bias value field. A range of the input value X is partitioned into a plurality of segments. Bias values $B_n$ corresponding to these segments are pre-stored in the bias value field of the lookup table 310. Each of these bias values in the bias value field of the lookup table 310 is a product of a curve function corresponding to a minimum value of the input value X in a corresponding segment of these segments and the error factor $2^N$.

When the input value X is input to the curve function device 300, the curve function device 300 may learn, according to first partial bits X1 of the input value X, that the input value X belongs to a corresponding segment (for example, an $n^{th}$ segment, which is referred to as a current segment below) of these segments. Therefore, the curve function device 300 can extract a bias value $B_n$ of the current segment and a bias value $B_{n+1}$ of a next segment (an adjacent segment of the current segment) from the bias value field of the lookup table 310 according to the first partial bits X1 of the input value.

The weight calculation circuit 320 can extract the bias value $B_n$ of the current segment and the bias value $B_{n+1}$ of the next segment from the bias value field of the lookup table 310 according to the first partial bits X1 of the input value X. The weight calculation circuit 320 may calculate a weight value $W_n$ of the current segment according to the bias value $B_n$ of the current segment and the bias value $B_{n+1}$ of the next segment. The linear function circuit 330 is coupled to the weight calculation circuit 320 to receive the weight value $W_n$ of the current segment. According to a design requirement, the lookup table 310 may further have a weight value $W_n$ of a last segment of these segments. When the current segment is the last segment, the linear function circuit 330 can obtain the weight value $W_n$ of the current segment (the last segment) from the lookup table 310 without extracting the weight value $W_n$ from the weight calculation circuit 320.

According to characteristics of the Tan h function (or the Sigmoid function), as the input value X becomes positively infinite (or negatively infinite), a slope (or a weight value $W_n$) of the Tan h function (or the Sigmoid function) approaches 0. Based on this characteristic and according to the design requirement, the lookup table 310 may not need to store the weight value $W_n$ of the last segment. When the current segment is the last segment, the linear function circuit 330 may use a value 0 as the weight value $W_n$ of the current segment (the last segment) without extracting the weight value $W_n$ from the lookup table 310 or the weight calculation circuit 320.

The linear function circuit 330 can extract the bias value $B_n$ of the current segment from the bias value field of the lookup table 310 according to the first partial bits X1 of the input value X. The linear function circuit 330 may calculate a linear function value T'(X) by using the bias value $B_n$ of the current segment, the weight value $W_n$ of the current segment, and second partial bits X2 of the input value X. The linear function value T'(X) may be used as an approximate value of a curve function (for example, the Tan h function or the Sigmoid function). The second partial bits X2 have S bits, that is, the input value X is partitioned from the input value X of 0, and each segment includes $2^S$ input values.

Figure 4:
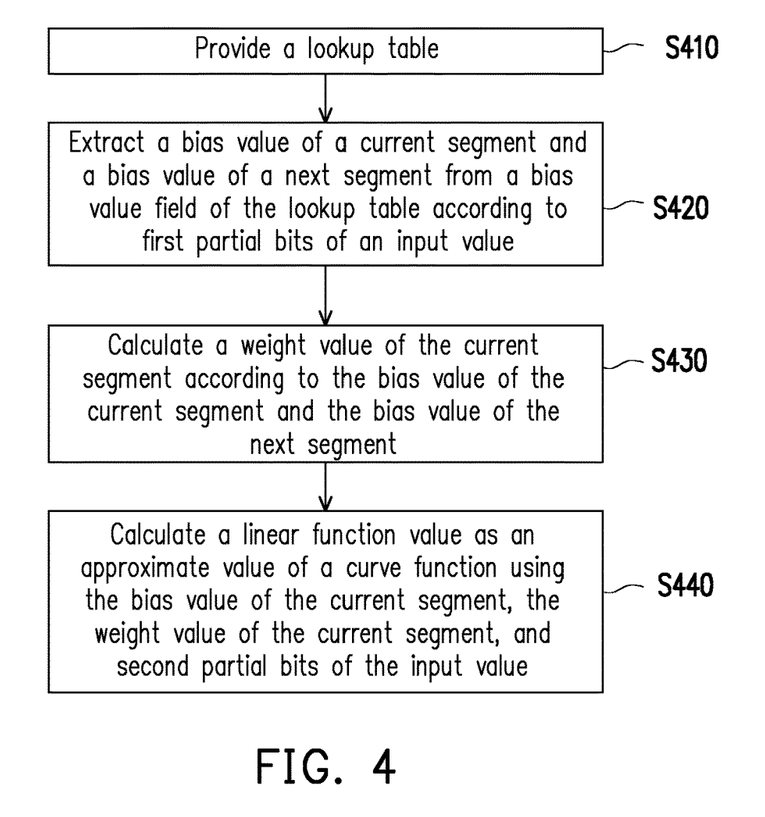
FIG. 4 is a schematic flowchart illustrating an operation method of a curve function device according to an embodiment of the disclosure.

FIG. 4 is a schematic flowchart illustrating an operation method of a curve function device according to an embodiment of the disclosure. Refer to FIG. 3 and FIG. 4. In step S410, the lookup table 310 is provided. In step S420, the curve function device 300 can extract the bias value $B_n$ of the current segment and the bias value $B_{n+1}$ of the next segment from the bias value field of the lookup table 310 according to the first partial bits X1 of the input value X. In step S430, the weight calculation circuit 320 may calculate the weight value $W_n$ of the current segment according to the bias value $B_n$ of the current segment and the bias value $B_{n+1}$ of the next segment. In step S440, the linear function circuit 330 may calculate, as an approximate value of a curve function (for example, Tan h), a linear function value T'(x) by using the bias value $B_n$ of the current segment, the weight value $W_n$ of the current segment, and the second partial bits X2 of the input value X.

For example, the linear function circuit 330 may calculate a linear function $$T'(X) = \left[\frac{W}{2^S} * (X2) + B\right] / 2^N$$

to obtain the linear function value T'(X). W is the weight value $W_n$ of the current segment (the corresponding segment of the input value X), X2 is the second partial bits of the input value X, B is the bias value $B_n$ of the current segment, S is a segment size value (a number of bits of the second partial bits X2), N is an error factor index, and S and N are integers.

Figure 5:
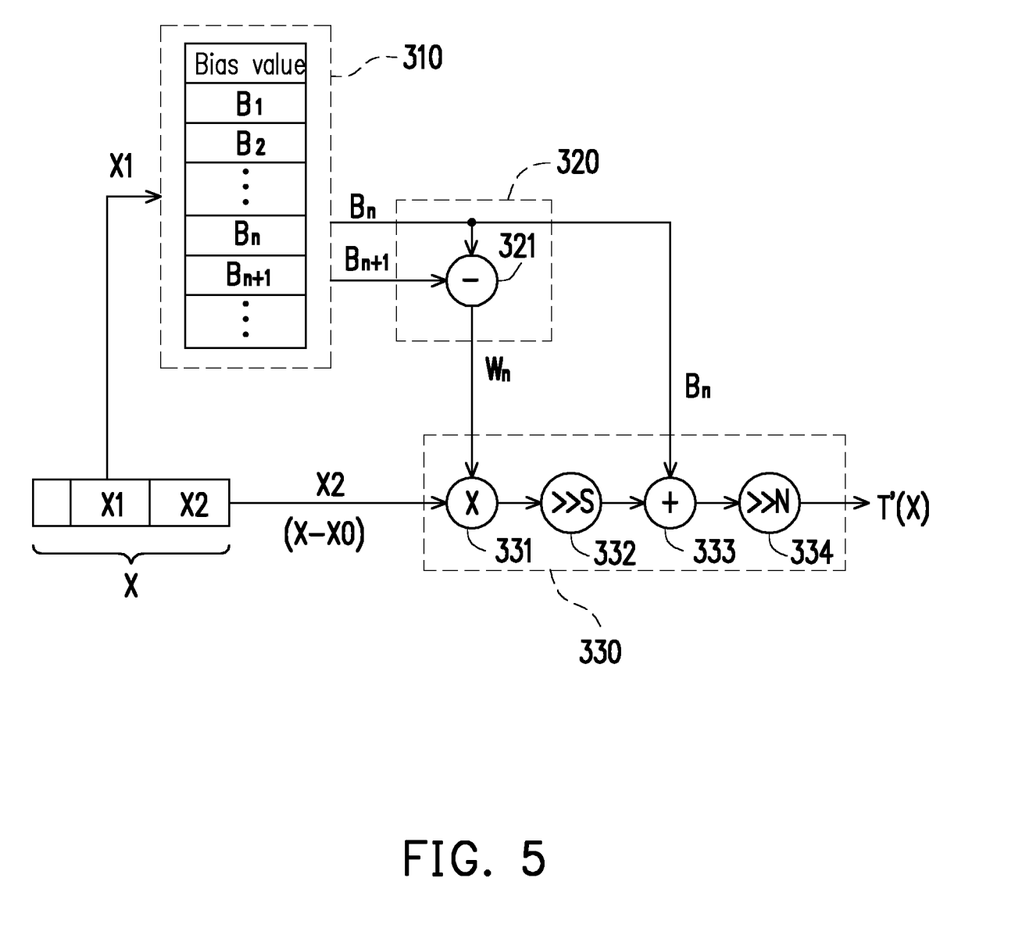
FIG. 5 is a schematic circuit block diagram illustrating a weight calculation circuit and a linear function circuit shown in FIG. 3 according to an embodiment of the disclosure.

FIG. 5 is a schematic circuit block diagram illustrating a weight calculation circuit 320 and a linear function circuit 330 shown in FIG. 3 according to an embodiment of the disclosure. A range of the input value X is partitioned into a plurality of segments, and bias values corresponding to different segments are pre-stored in a bias value field of a lookup table 310 shown in FIG. 5, for example, a bias value $B_1$ corresponding to a first segment, a bias value $B_2$ corresponding to a second segment, . . . , a bias value $B_n$ (n is an integer) corresponding to an $n^{th}$ segment, and a bias value $B_{n+1}$ corresponding to an $(n+1)^{th}$ segment. It is assumed herein that the $n^{th}$ segment of the range of the input value X is the current segment (a corresponding segment of a current input value X).

The weight calculation circuit 320 shown in FIG. 5 includes a subtraction circuit 321. The subtraction circuit 321 of the weight calculation circuit 320 may calculate a difference of the bias value $B_n$ of the current segment and the bias value $B_{n+1}$ of a next segment as a weight value $W_n$ of the current segment.

The linear function circuit 330 shown in FIG. 5 includes a multiplication circuit 331, a division circuit 332, an addition circuit 333, and a division circuit 334. The multiplication circuit 331 is coupled to the weight calculation circuit 320 to receive the weight value $W_n$ of the current segment. The multiplication circuit 331 may calculate a product of second partial bits X2 of the input value X and the weight value $W_n$ of the current segment. The division circuit 332 is coupled to the multiplication circuit 331 to receive the product. The division circuit 332 may calculate a quotient of the product and a segment size value $2^S$. In this embodiment, the division circuit 332 may be a right shifter, and the right shifter may shift the product output by the multiplication circuit 331 to the right by S bits, to obtain the quotient.

The addition circuit 333 is coupled to the division circuit 332 to receive the quotient. The addition circuit 333 may extract the bias value $B_n$ of the current segment from the bias value field of the lookup table 310 according to the first partial bits X1 of the input value Z. The addition circuit 333 may calculate a sum of the quotient output by the division circuit 332 and the bias value $B_n$ of the current segment. The division circuit 334 is coupled to the addition circuit 333 to receive the sum. The division circuit 334 may calculate a quotient of a sum output by the addition circuit 333 and an error factor $2^N$, where the quotient is used as a linear function value T'(X). In this embodiment, the division circuit 334 may be a right shifter, and the right shifter may shift the sum output by the addition circuit 333 to the right by N bits, to obtain the quotient (the linear function value T'(X)).

Figure 6:
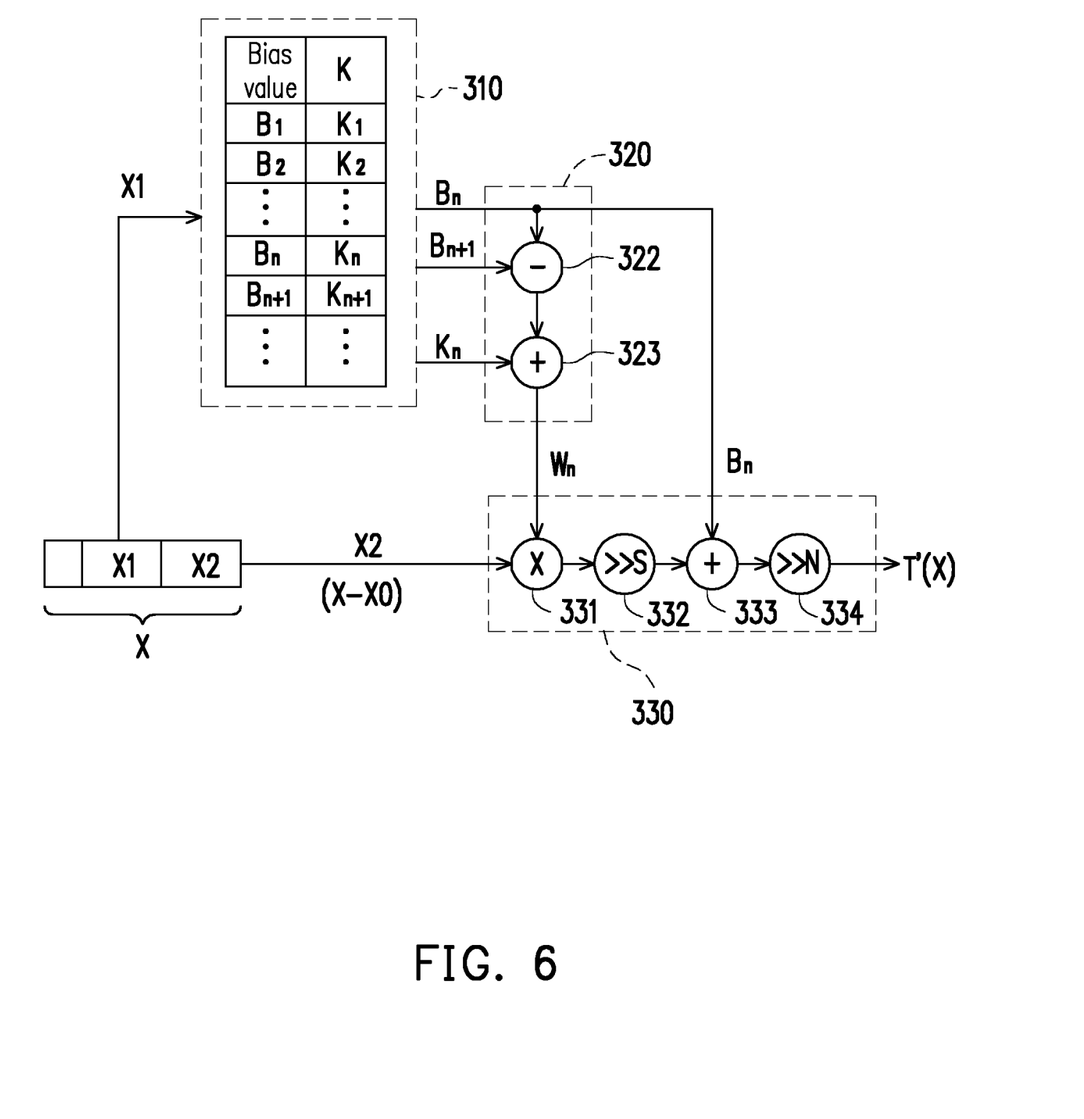
FIG. 6 is a circuit block diagram illustrating a weight calculation circuit shown in FIG. 3 according to another embodiment of the present disclosure.

FIG. 6 is a schematic circuit block diagram illustrating a weight calculation circuit 320 shown in FIG. 3 according to another embodiment of the present disclosure. The linear function circuit 330 shown in FIG. 6 may be analogized with reference to the related description of FIG. 5, and the descriptions thereof are omitted herein. In the embodiment shown in FIG. 6, a lookup table 310 has a bias value field and a correction factor field. For the bias value field of the lookup table 310 shown in FIG. 6, reference may be made to the related description of FIG. 5. The range of the input value X is partitioned into a plurality of segments, and the correction factor field of the lookup table 310 shown in FIG. 6 pre-stores K values (correction factors) corresponding to different segments. For example, a K value corresponding to the first segment is $K_1$, a K value corresponding to the second segment is $K_2$, . . . , a K value corresponding to the $n^{th}$ segment is $K_n$ (n is an integer), and a K value corresponding to the $(n+1)^{th}$ segment is $K_{n+1}$. It is assumed herein that the $n^{th}$ segment of the range of the input values X is the current segment (a corresponding segment of the current input value X).

A weight calculation circuit 320 may extract a K value (a correction factor) of the current segment from the correction factor field of the lookup table 310 according to first partial bits X1 of the input value X. The weight calculation circuit 320 calculates a weight value $W_n$ of the current segment according to a correction factor (the K value) of the current segment, a bias value $B_n$ of the current segment, a bias value $B_{n+1}$ of a next segment. For example, the weight calculation circuit 320 may calculate a difference of the bias value $B_n$ of the current segment and the bias value $B_{n+1}$ of the next segment, and then may calculate a sum of the difference and the correction factor (the K value) of the current segment as a weight value $W_n$ of the current segment.

The weight calculation circuit 320 shown in FIG. 6 includes a subtraction circuit 322 and addition circuit 323. The subtraction circuit 322 of the weight calculation circuit 320 may calculate a difference between the bias value $B_n$ of the current segment and the bias value $B_{n+1}$ of a next segment. The addition circuit 323 is coupled to the subtraction circuit 322 to receive the difference. The addition circuit 323 may calculate a sum of the difference and the correction factor (the K value) of the current segment as the weight value $W_n$ of the current segment.

Two operation examples are used for description below, and a to-be-approximated Tan h function and Sigmoid function are calculated by the circuit shown in FIG. 5 or FIG. 6.

In the operation example I, it is assumed that a range of the input value X is 0 to 0.156005859375, and a number of integer bits and a number of decimal bits of the input value X are respectively 4-bit and 12-bit, and an error target (an absolute value) is less than $\frac{1}{2}^{12}=0.000244140625\approx2.44*10^{-4}$. Herein, the range of the input value X is partitioned into 5 segments, each of which contains $2^7=128$ input values X (that is, a segment size value S is 7). Based on the error target requirement, the error factor is $2^{13}$ (that is, an index N of the error factor is 13). In the operation example I, content of the lookup table 310 may be content shown in Table 1. In the operation example I, a relatively small range of input values is used for ease of description. Therefore, the lookup table 310 pre-stores a weight value $W_n$ of one last segment of these segments.

TABLE 1

Example of content of the lookup table 310

| Bit X1 (Range of input values X) | Bias value $B_n$ | K | Weight value $W_n$ |
|---|---|---|---|
| 0 (0.00000-0.031005859375) | Tanh(0.00000) *$2^{13}$ = 0 | 0 | |
| 1 (0.03125-0.062255859375) | Tanh(0.03125) *$2^{13}$ = 256 | 1 | |
| 2 (0.06250-0.093505859375) | Tanh(0.06250) *$2^{13}$ = 511 | 1 | |
| 3 (0.09375-0.124755859375) | Tanh(0.09375) *$2^{13}$ = 766 | 0 | |
| 4 (0.12500-0.156005859375) | Tanh(0.12500) *$2^{13}$ = 1019 | 1 | 251 |

Herein, any point within the range of the input value X is extracted for describing the calculation process. For example, 0.063720703125 (that is, the binary 0000000100000101) is used as the input value X to describe the calculation process. That is, first partial bits X1 of the input value X is 00010, and second partial bits X2 of the input value X is 0000101. Based on the first partial bits X1 of the input value X and Table 1, the bias value $B_n$ of the current segment is 511, the bias value $B_{n+1}$ of the next segment (an adjacent segment of the current segment) is 766, and the K value (a correction factor) of the current segment is 1.

In a low-cost mode, the weight calculation circuit 320 may calculate a low-cost weight $W_{LC}=B_{n+1}-B_n=766-511=255$ (as the weight value $W_n$ of the current segment) according to Equation 4. Alternatively, in a high-accuracy mode, the weight calculation circuit 320 may calculate a high-accuracy weight $W_{HA}=W_{LC}+K=255+1=256$ (as the weight value $W_n$ of the current segment) according to Equation 5.

According to Equation 6, the linear function circuit 330 may calculate a linear function value T'(X) by using the bias value $B_n$ of the current segment, the weight value $W_n$ of the current segment, and second partial bits X2 of the input value X. For the input value X being 0.063720703125 (that is, the binary 0000000100000101), a calculation result of the linear function circuit 330 is shown in Table 2.

TABLE 2

Calculation result of the linear function circuit 330

| Mode | Function | Calculation result | Target value | Absolute error |
|---|---|---|---|---|
| LC Mode | Tanh | 0.0634765625 | 0.0636346006455 | $1.58*10^{-4}$ |
|  | Sigmoid | 0.5158081054688 | 0.515924787824 | $1.17*10^{-4}$ |
| HA mode | Tanh | 0.0635986328125 | 0.0636346006455 | $0.36*10^{-4}$ |
|  | Sigmoid | 0.515869140625 | 0.515924787824 | $0.56*10^{-4}$ |

In the operation example II, it is assumed that a range of the input value X is 0 to 4.999755859375, and number of integer bits and a number of decimal bits of the input value X are respectively 4-bit and 12-bit, an error target (an absolute value) is less than $\frac{1}{2}^{13}=0.0001220703125\approx 1.22*10^{-4}$. Herein, the range of the input value X is partitioned into 160 segments, each of which contains $2^7=128$ input values X (that is, a segment size value S is 7). Based on the error target requirement, the error factor is $2^{14}$ (that is, an index N of the error factor is 14). In the operation example II, content of the lookup table 310 may be content shown in Table 3. According to characteristics of the Tan h function (or the Sigmoid function), as the input value X becomes positively infinite (or negatively infinite), a slope (or a weight value $W_n$) of the Tan h function (or the Sigmoid function) approaches 0. Therefore, in the operation example II, the lookup table 310 does not need to pre-store the weight value $W_n$ of the last segment.

TABLE 3

Example of content of the lookup table 310

| Bit X1 (Range of input values X) | Bias value $B_n$ | K |
|---|---|---|
| 0 (0.00000-0.031005859375) | 0 | 0 |
| 1 (0.03125-0.062255859375) | 512 | 1 |
| 2 (0.06250-0.093505859375) | 1023 | 1 |

TABLE 3-continued

Example of content of the lookup table 310

| Bit X1 (Range of input values X) | Bias value $B_n$ | K |
|---|---|---|
| 3 (0.09375-0.124755859375) | 1532 | 0 |
| 4 (0.12500-0.156005859375) | 2037 | 1 |
| ... | ... | ... |
| 157 (4.90625-4.937255859375) | 16382 | 0 |
| 158 (4.93750-4.968505859375) | 16382 | 0 |
| 159 (4.96875-4.999755859375) | 16382 | 1 |

Herein, any point within the range of the input value X is extracted for describing the calculation process. A plurality of values are extracted from 0 to 4.999755859375 and used as input values X, to calculate a plurality of linear function values T'(X). Calculation details of the operation example U may be analogized with reference to the related description of the foregoing operation example I, and the descriptions thereof are omitted herein. An absolute error of the operation example II is shown in Table 4.

TABLE 4

Absolute Error

| Mode | Function | Absolute error | Target error |
|---|---|---|---|
| LC Mode | Tanh | $1.64*10^{-4}$ | $1.22*10^{-4}$ |
|  | Sigmoid | $1.33*10^{-4}$ | $1.22*10^{-4}$ |
| HA mode | Tanh | $1.19*10^{-4}$ | $1.22*10^{-4}$ |
|  | Sigmoid | $1.09*10^{-4}$ | $1.22*10^{-4}$ |

When the error factor is $2^{14}$, the absolute error calculated by using the low-cost weight $W_{LC}$ in the low-cost mode (LC mode) is larger than the target error. Error factors $2^N$ being increased to $2^{15}$ is used as an operation example III, and a plurality of bias values and linear function values T'(X) are calculated again. An absolute error of the operation example III is shown in Table 5.

TABLE 5

Absolute error

| Mode | Function | Absolute error | Target error |
|---|---|---|---|
| LC Mode | Tanh | $1.31*10^{-4}$ | $1.22*10^{-4}$ |
|  | Sigmoid | $1.09*10^{-4}$ | $1.22*10^{-4}$ |

The error factor $2^N$ is increased, so that an approximation error can be reduced, but the bias value is also increased accordingly. Therefore, the user may determine the error factor $2^N$ according to design requirements (such as an error magnitude) and requirements for hardware costs, and/or choose to use the low-cost mode or the high-accuracy mode (HA mode). According to the error estimation mechanism, a curve function device 300 may achieve a user-defined error target. When the storage space is limited, the curve function device 300 may be run in a low-cost mode to further reduce a usage amount of storage space. The curve function device 300 may be run in a high-accuracy mode by adding some storage space to further reduce an approximation error.

According to different design requirements, implementations of blocks of the foregoing function device 300, the lookup table 310, the weight calculation circuit 320, and/or the linear function circuit 330 may be in a hardware form, in a firmware form, in a software (software, that is, a program) form, or in a form of a combination of a plurality of the foregoing three.

In the hardware form, blocks of the function device 300, the lookup table 310, the weight calculation circuit 320, and/or the linear function circuit 330 may be implemented in a logic circuit on an integrated circuit. Related functions of the function device 300, the lookup table 310, the weight calculation circuit 320, and/or the linear function circuit 330 may be implemented as hardware by using hardware description languages (such as Verilog HDL or VHDL) or other suitable programming languages. For example, the related functions of the function device 300, the lookup table 310, the weight calculation circuit 320, and/or the linear function circuit 330 may be implemented in one or more controllers, microcontrollers, microprocessors, an application-specific integrated circuit (ASIC), a digital signal processor (DSP), a Field Programmable Gate Array (FPGA), and/or various logical blocks, modules and circuits in other processing units.

In the firmware form, the related functions of the function device 300, the lookup table 310, the weight calculation circuit 320, and/or the linear function circuit 330 may be implemented as programming codes. For example, the function device 300, the lookup table 310, the weight calculation circuit 320, and/or the linear function circuit 330 are implemented by using general programming languages (such as C, C++, or a combined language) or other suitable programming languages. The programming code may be recorded/stored in a recording medium, the recording medium including, for example, a read-only memory (ROM), a storage device, and/or a random access memory (RAM). A computer, a central processing unit (CPU), a controller, a microcontroller, or a microprocessor may read from the recording medium and execute the programming code, to achieve a related function. A "non-transitory computer readable medium" may be used as the recording medium, for example, a tape, a disk, a card, a semiconductor memory, a programming logic circuit, or the like. Moreover, the program may also be provided to the computer (or the CPU) via any transmission medium (a communication network or a broadcast wave, etc.). For example, the communication network is the Internet, a wired communication medium, a wireless communication medium, or other communication media.

Based on the above, according to the curve function device 300 and the operation method thereof in the embodiments of the present disclosure, the range of the input value X may be partitioned into a plurality of segments, where the bias values $B_n$ corresponding to these segments are pre-stored in the bias value field of the lookup table 310. When the input value X is input to the curve function device 300, the curve function device 300 may learn the corresponding segment (the current segment) of the input value X according to the first partial bits X1 of the input value X. Therefore, the curve function device 300 may extract the bias value $B_n$ of the current segment and the bias value $B_{n+1}$ of a next segment (an adjacent segment of the current segment) from the bias value field of the lookup table according to the first partial bits X1 of the input value X. The bias value $B_n$ of the current segment and the bias value $B_{n+1}$ of the next segment may be used to calculate the weight value $W_n$ of the current segment. The bias value $B_n$ of the current segment and the weight value $W_n$ of the current segment may be used as a coefficient of the linear function corresponding to the current segment. Therefore, the linear function circuit 330 may calculate the linear function value T'(X) by using the bias value $B_n$ of the current segment, the weight value $W_n$ of the current segment, and the second partial bits X2 of the input value X, and then the linear function value T'(X) is used as the approximate value of the curve function.

Although the present disclosure is described with reference to the above embodiments, the embodiments are not intended to limit the present disclosure. A person of ordinary skill in the art may make variations and modifications without departing from the spirit and scope of the present disclosure. Therefore, the protection scope of the present disclosure should be subject to the appended claims.

What is claimed is:

1. A curve function device configured to calculate an approximate value of a curve function by using an input value, the function device comprising:
a lookup table having at least one bias value field;
a weight calculation circuit extracting a bias value of a current segment and a bias value of a next segment from the bias value field of the lookup table according to a first partial bits of the input value and calculating a weight value of the current segment according to the bias value of the current segment and the bias value of the next segment; and
a linear function circuit coupled to the weight calculation circuit to receive the weight value of the current segment, wherein the linear function circuit extracts the bias value of the current segment from the bias value field of the lookup table according to the first partial bits of the input value, and the linear function circuit calculates a linear function value as the approximate value of the curve function by using the bias value of the current segment, the weight value of the current segment, and a second partial bits of the input value.

2. The curve function device according to claim 1, wherein the linear function circuit calculates a linear function $$T'(X) = \left[\frac{W}{2^S} * (X2) + B\right] / 2^N$$

to obtain the linear function value T'(x), W being the weight value of the current segment, x2 being the second partial bits of the input value, B being the bias value of the current segment, being a segment size value, N being an error factor index, and S and N being integers.

3. The curve function device according to claim 1, wherein the linear function circuit comprises:
a multiplication circuit coupled to the weight calculation circuit to receive the weight value of the current segment, wherein the multiplication circuit calculates a product of the second partial bits of the input value and the weight value of the current segment;

a first division circuit coupled to the multiplication circuit to receive the product, wherein the first division circuit calculates a quotient of the product and a segment size value;

an addition circuit coupled to the first division circuit to receive the quotient, wherein the addition circuit extracts the bias value of the current segment from the bias value field of the lookup table according to the first partial bits of the input value, and the addition circuit calculates a sum of the quotient and the bias value of the current segment; and a second division circuit coupled to the addition circuit to receive the sum, wherein the second division circuit calculates a quotient of the sum and an error factor, the quotient being used as the linear function value T'(x).

4. The curve function device according to claim 3, wherein the first division circuit is a right shifter, and the second division circuit is another right shifter.

5. The curve function device according to claim 1, wherein the curve function is Tan h(X) or Sigmoid(X), X being partitioned into a plurality of segments, and each of these bias values in the bias value field of the lookup table being a product of the curve function corresponding to a minimum value of X in a corresponding segment of these segments and an error factor.

6. The curve function device according to claim 1, wherein the lookup table further has a weight value of a last segment.

7. The curve function device according to claim 1, wherein the weight calculation circuit calculates a difference between the bias value of the current segment and the bias value of the next segment as the weight value of the current segment.

8. The curve function device according to claim 1, wherein the lookup table further has a correction factor field, the weight calculation circuit extracting a correction factor of the current segment from the correction factor field of the lookup table according to the first partial bits of the input value, and the weight calculation circuit calculating the weight value of the current segment according to the correction factor of the current segment, the bias value of the current segment, and the bias value of the next segment.

9. The curve function device according to claim 8, wherein the weight calculation circuit calculates a difference between the bias value of the current segment and the bias value of the next segment, and calculates a sum of the difference and the correction factor of the current segment as the weight value of the current segment.

10. The curve function device according to claim 8, wherein the weight calculation circuit comprises:

a subtraction circuit calculating a difference between the bias value of the current segment and the bias value of the next segment; and an addition circuit coupled to the subtraction circuit to receive the sum, wherein the addition circuit calculates a sum of the difference and the correction factor of the current segment as the weight value of the current segment.

11. An operation method of a curve function device, the curve function device being configured to calculate an approximate value of a curve function by using an input value, and the operation method comprising:

providing a lookup table;

extracting a bias value of a current segment and a bias value of a next segment from a bias value field of the lookup table according to a first partial bits of the input value;

calculating, by a weight calculation circuit, a weight value of the current segment according to the bias value of the current segment and the bias value of the next segment; and calculating, by a linear function circuit, a linear function value as the approximate value of the curve function by using the bias value of the current segment, the weight value of the current segment, and a second partial bits of the input value.

12. The operation method according to claim 11, wherein the calculating the linear function value comprises:

calculating, by the linear function circuit, a linear function $$T'(X) = \left[\frac{W}{2^S} * (X2) + B\right] / 2^N$$

to obtain the linear function value T'(x), W being the weight value of the current segment, x2 being the second partial bits of the input value, B being the bias value of the current segment, S being a segment size value, N being an error factor index, and S and N being integers.

13. The operation method according to claim 11, wherein the calculating the linear function value comprises:

calculating, by a multiplication circuit, a product of the second partial bits of the input value and the weight value of the current segment;

calculating, by a first division circuit, a quotient of the product and a segment size value;

calculating, by an addition circuit, a sum of the quotient and the bias value of the current segment; and calculating, by a second division circuit, a quotient of the sum and an error factor, wherein the quotient being used as the linear function value T'(x).

14. The operation method according to claim 13, wherein the first division circuit is a right shifter, and the second division circuit is another right shifter.

15. The operation method according to claim 11, wherein the curve function is Tan h(X) or Sigmoid(X), X being partitioned into a plurality of segments, each of these bias values in the bias value field of the lookup table being a product of the curve function corresponding to a minimum value of X in a corresponding segment of these segments and an error factor.

16. The operation method according to claim 11, wherein the lookup table further has a weight value of a last segment.

17. The operation method according to claim 11, wherein the step of calculating the weight value of the current segment comprises:

calculating, by the weight calculation circuit, a difference between the bias value of the current segment and the bias value of the next segment, wherein the difference is used as the weight value of the current segment.

18. The operation method according to claim 11, wherein the step of calculating the weight value of the current segment comprises:

extracting a correction factor of the current segment from a correction factor field of the lookup table according to the first partial bits of the input value; and calculating, by the weight calculation circuit, the weight value of the current segment according to the correction factor of the current segment, the bias value of the current segment, and the bias value of the next segment.

19. The operation method according to claim 18, wherein the step of calculating the weight value of the current segment according to the correction factor of the current segment, the bias value of the current segment, and the bias value of the next segment comprises:
- calculating, by the weight calculation circuit, a difference between the bias value of the current segment and the bias value of the next segment; and
- calculating, by the weight calculation circuit, a sum of the difference and the correction factor of the current segment, wherein the sum is used as the weight value of the current segment.

* * * * *